United States Patent
Ikenaga et al.

(10) Patent No.: US 10,279,263 B2
(45) Date of Patent: May 7, 2019

(54) GAME DELIVERY DEVICE, GAME DELIVERY METHOD, AND GAME DELIVERY PROGRAM

(71) Applicant: Sony Interactive Entertainment Inc., Tokyo (JP)

(72) Inventors: Toshiya Ikenaga, Tokyo (JP); Toshiharu Sayano, Kanagawa (JP); Yasuhiro Watari, Tokyo (JP); Shinkichi Hasama, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 206 days.

(21) Appl. No.: 15/302,070

(22) PCT Filed: Apr. 15, 2015

(86) PCT No.: PCT/JP2015/061561
§ 371 (c)(1),
(2) Date: Oct. 5, 2016

(87) PCT Pub. No.: WO2015/163208
PCT Pub. Date: Oct. 29, 2015

(65) Prior Publication Data
US 2017/0113139 A1    Apr. 27, 2017

(30) Foreign Application Priority Data
Apr. 22, 2014 (JP) ................................ 2014-088354

(51) Int. Cl.
*A63F 13/60* (2014.01)
*A63F 13/35* (2014.01)
(Continued)

(52) U.S. Cl.
CPC .............. *A63F 13/60* (2014.09); *A63F 13/35* (2014.09); *A63F 13/533* (2014.09); *A63F 13/69* (2014.09);
(Continued)

(58) Field of Classification Search
CPC ........ A63F 13/35; A63F 13/533; A63F 13/69; A63F 13/60; A63F 13/816; A63F 2300/8005; A63F 2300/51
(Continued)

(56) References Cited

U.S. PATENT DOCUMENTS 7,346,439 B2 * 3/2008 Bodin ..................... B60R 25/00
                                                                            307/10.3
8,478,855 B1    7/2013 Evans
(Continued)

FOREIGN PATENT DOCUMENTS

EP    1022672 A1    7/2000

OTHER PUBLICATIONS

Office Action for corresponding JP Application No. 2016-514881, 12 pages, dated Apr. 25, 2017.
(Continued)

*Primary Examiner* — Michael A Cuff
(74) *Attorney, Agent, or Firm* — Matthew B. Dernier, Esq.

(57) ABSTRACT

A game delivery device and so on are implemented which enable an operable object to be operated with increased ease, in the case where game images designed to be executed in a dedicated game device are delivered to a terminal. The game delivery device includes execution means for executing a plurality of game programs designed to be executed in a dedicated game device in accordance with operation information; game program selection means for selecting one of the game programs on the basis of a selection
(Continued)

instruction from a terminal; delivery means for delivering, to the terminal, image information based on execution of the selected game program; play mode acquisition means for acquiring a play mode selection instruction indicating whether the selected game program is to be played in a normal mode or an auxiliary mode; and auxiliary means for, when the auxiliary mode is selected, providing an auxiliary function that makes an operation of an operable object of the selected game program easier than the operation of the operable object designed to be performed in the dedicated game device.

12 Claims, 7 Drawing Sheets

(51) Int. Cl.
    *A63F 13/533*     (2014.01)
    *A63F 13/69*     (2014.01)
    *A63F 13/816*     (2014.01)

(52) U.S. Cl.
    CPC ........ *A63F 13/816* (2014.09); *A63F 2300/51* (2013.01); *A63F 2300/8005* (2013.01)

(58) Field of Classification Search
    USPC .......................................................... 463/42
    See application file for complete search history.

(56) References Cited

U.S. PATENT DOCUMENTS

| | | | |
|---|---|---|---|
| 2006/0195869 A1 | 8/2006 | Holm | |
| 2006/0247061 A1* | 11/2006 | Nogami | A63F 13/12 463/42 |
| 2007/0054717 A1 | 3/2007 | Youm | |
| 2007/0093294 A1* | 4/2007 | Serafat | A63F 13/12 463/39 |
| 2009/0307173 A1 | 12/2009 | Tzruya | |
| 2010/0234109 A1 | 9/2010 | Chiu | |
| 2013/0205220 A1* | 8/2013 | Yerli | H04L 67/36 715/748 |

OTHER PUBLICATIONS

InternetWatch, Impress Corporation, May 27, 2013, "Broadmedia launches cloud gaming machine "G-cluster" on Jun. 20" [online], URL:http://internet.watch.impress.co.jp/docs/news/601129.html, 5 pages (for relevancy see Office Action for corresponding JP Application No. 2016-514881, dated Apr. 25, 2017.

AppBank, Sep. 16, 2011, "Street Fighter II Collection: How it differs from CAPCOM's arcade version" [online], URL:http://www.appbank.net/2011/09/16/iphoneapplication/299492.php, 5 pages. (for relevancy see Office Action for corresponding JP Application No. 2016-514881, dated Apr. 25, 2017.

PhoneGameCast, Jan. 18, 2012, "Review: Retro game Rockman (Mega Man) X fine-tuned for iPhone" [online], URL: http://www.gamecastblog. com/archives/65643123.html, 7 pages (for relevancy see Office Action for corresponding JP Application No. 2016-514881, dated Apr. 25, 2017.

European Search Report for corresponding EP Application No. 15782360, 9 pages, dated Sep. 27, 2017.

International Preliminary Report on Patentability and Written Opinion for corresponding PCT Application No. PCT/JP2015/061561, 6 pages, dated Nov. 3, 2016.

International Search Report for corresponding PCT Application No. PCT/JP2015/061561, 4 pages, dated May 19, 2015.

DS&PSP (Ura) Hack Tettei Kensho, Otona no Windows, whole No. 32, 1 page, (Dec. 28, 2010) (for relevancy see International Search Report for corresponding PCT Application No. PCT/JP2015/061561, 4 pages, dated May 19, 2015).

Fighting Studio, CAP COM Kanpeki Koryaku Series 3 Super Street Fighter IIX Revival Taisen Saikyo Manual, Cap com Co., Ltd., 1 page, Aug. 5, 2001 (for relevancy see International Search Report for corresponding PCT Application No. PCT/JP2015/061561, 4 pages, dated May 19, 2015).

New Super Mario Brothers 2, Nintendo Dream the September issue, 1 pages, Jul. 21, 2012 (for relevancy see International Search Report for corresponding PCT Application No. PCT/JP2015/061561, 4 pages, dated May 19, 2015).

Kingdom Hearts Final Mix, Dengeki PlayStation, vol. 224, 1 page, Nov. 29, 2002 (for relevancy see International Search Report for corresponding PCT Application No. PCT/JP2015/061561, 4 pages, dated May 19, 2015).

Star Fox 64 3D, Fami-tsu DS+Wii, the Jul. 2011, issue, 1 page, May 21, 2011 (for relevancy see International Search Report for corresponding PCT Application No. PCT/JP2015/061561, 4 pages, dated May 19, 2015).

* cited by examiner

FIG.6
| PROGRAM ID | EXECUTION STATE ID | ACQUISITION TIMING INFORMATION | OUTPUT TIMING INFORMATION | OPERATION INFORMATION ID |
|---|---|---|---|---|
| P1 | S1 | t1~t2 | t3 | b1 |
| P2 | S1 | t1~t2 | t3 | b1 |
| P2 | S2 | t1~t2 | t3 | b2 |
FIG.7
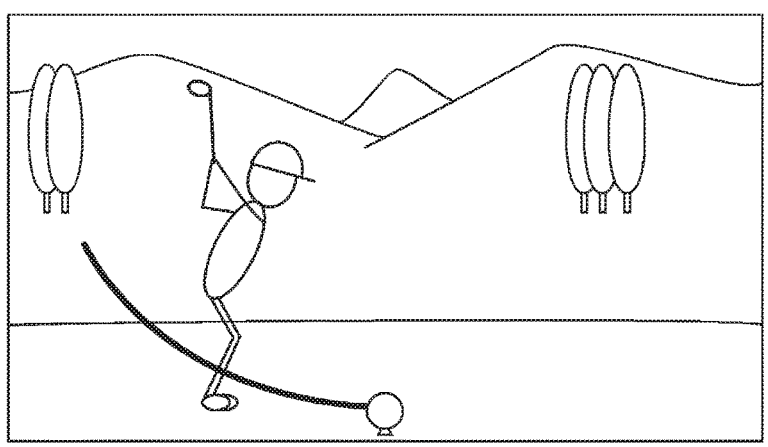
FIG.8
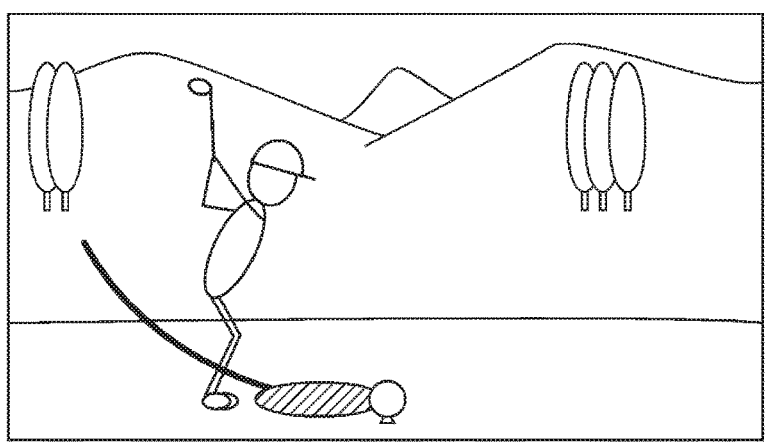

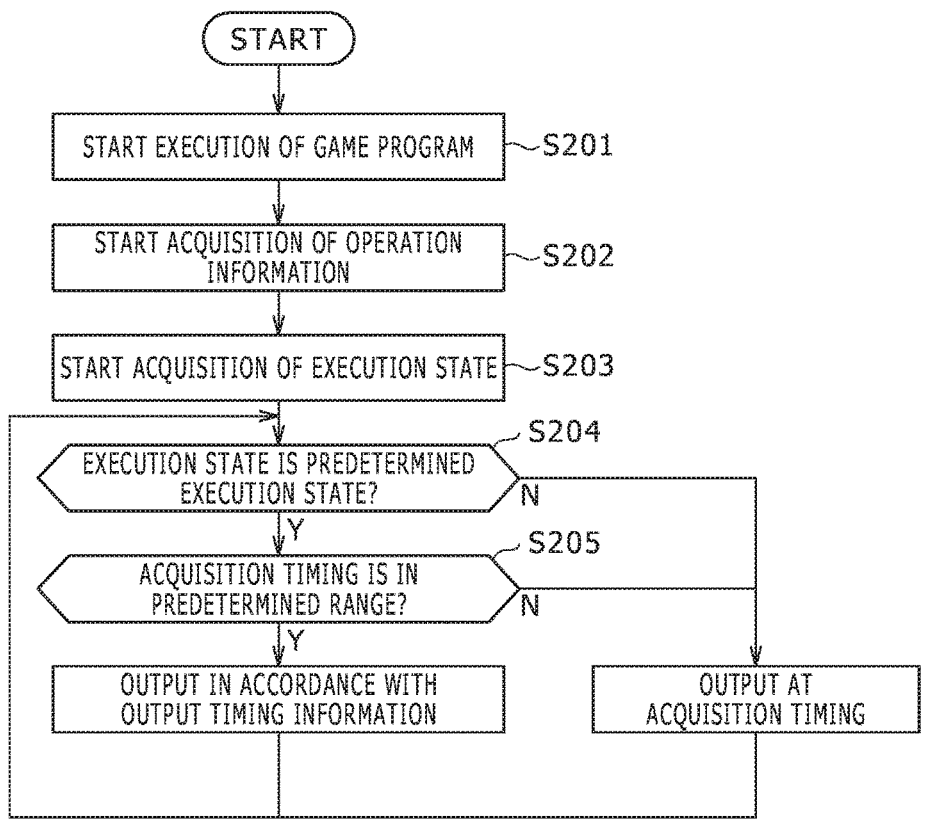

FIG.12
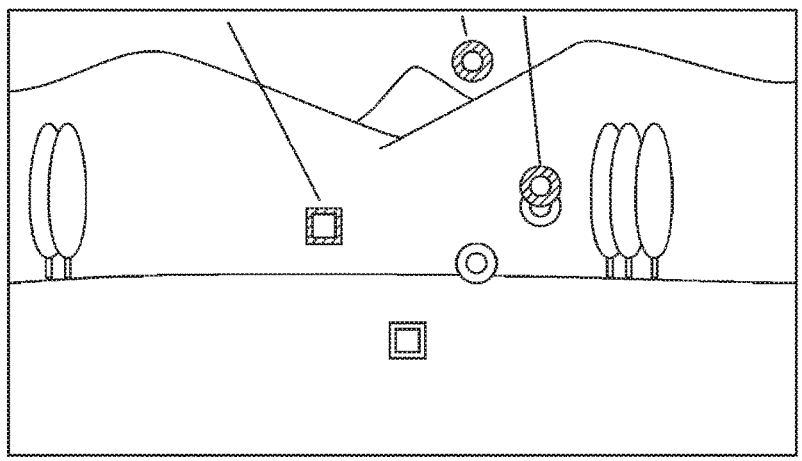
FIG.13
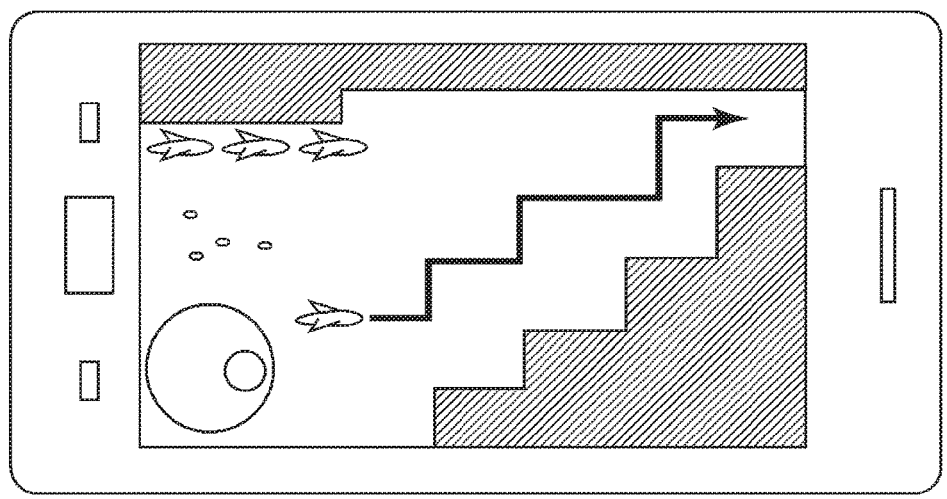
FIG.14
| PROGRAM ID | EXECUTION STATE ID | OPERATION SERIES INFORMATION ID | OPERATION INFORMATION ID |
|---|---|---|---|
| P4 | S3 | S1 | S2 |
| | | | |

GAME DELIVERY DEVICE, GAME DELIVERY METHOD, AND GAME DELIVERY PROGRAM

TECHNICAL FIELD

The present invention relates to a game delivery device, a game delivery method, and a game delivery program.

BACKGROUND ART

A cloud gaming system based on streaming is known. According to this technology, a game program is executed on a cloud side, and image information generated by execution of the game program is delivered in a compressed form to a terminal via streaming.

SUMMARY

Technical Problems

Here, in the cloud gaming system as described above, for example, image information of a game that is designed to be executed in a dedicated game device, such as an old game program, is sometimes delivered. In this case, when the terminal is a smartphone, for example, in the cloud gaming system, operations by a user may become difficult because an operable object of the game is not originally supposed to be operated with the smartphone.

The present invention has been conceived to implement a game delivery device and so on which enable a user to operate an operable object with increased ease, even in the case where operations by the user become difficult when game images designed to be executed in a dedicated game device are delivered to a terminal as described above, for example.

Solution to Problems (1) A game delivery device according to the present invention includes execution means for executing a plurality of game programs designed to be executed in a dedicated game device in accordance with operation information; game program selection means for selecting one of the plurality of game programs on a basis of a selection instruction from a terminal; delivery means for delivering, to the terminal, image information based on execution of the selected game program; play mode acquisition means for acquiring a play mode selection instruction indicating whether the selected game program is to be played in a normal mode or an auxiliary mode; and auxiliary means for, when the auxiliary mode is selected, providing an auxiliary function that makes an operation of an operable object of the selected game program easier than the operation of the operable object designed to be performed in the dedicated game device.

(2) In the game delivery device as described in (1) above, the auxiliary means may further include state acquisition means for acquiring an execution state of the execution means; and state determination means for determining whether or not the acquired execution state satisfies a predetermined condition, and the auxiliary means may provide the auxiliary function when the state determination means has determined that the predetermined condition is satisfied.

(3) In the game delivery device as described in (2) above, the auxiliary means may further include auxiliary information acquisition means for acquiring auxiliary information including, in a correlated manner, game program identification information that identifies the selected game program, execution state identification information related to the predetermined condition, output timing information that represents an output timing of predetermined operation information, and operation information identification information that identifies the predetermined operation information; timing determination means for, when the state determination means has determined that the predetermined condition is satisfied, determining whether or not a timing of acquisition of the operation information identified by the operation information identification information included in the auxiliary information is in a timing range represented by the output timing information; and operation information output means for outputting the operation information to the execution means at the output timing represented by the output timing information in accordance with a result of a determination by the timing determination means.

(4) In the game delivery device as described in any one of (1) to (3) above, the auxiliary function may be a function of causing operation information acquired at a timing earlier than a previously set timing to be inputted to the execution means at the previously set timing.

(5) In the game delivery device as described in (2) above, the auxiliary means may further include auxiliary information acquisition means for acquiring auxiliary information including, in a correlated manner, game program identification information that identifies the selected game program, execution state identification information that represents a predetermined execution state of the execution means, operation series information identification information that identifies information as to a series of operations, and operation information identification information that identifies predetermined operation information; and operation information output means for outputting the operation series information identification information to the execution means when the state determination means has determined that the predetermined condition is satisfied, and the predetermined operation information has been acquired.

(6) In the game delivery device as described in (5) above, the auxiliary means may further include position information acquisition means for acquiring position information representing a position of the operable object, and the information as to the series of operations may be modified in accordance with the position information.

(7) In the game delivery device as described in (2) above, the auxiliary means may further include auxiliary information acquisition means for acquiring auxiliary information including, in a correlated manner, game program identification information that identifies the selected game program, execution state identification information related to the predetermined condition, output timing information that represents an output timing of predetermined operation information, and operation information identification information that identifies the predetermined operation information; timing determination means for, when the state determination means has determined that the predetermined condition is satisfied, determining whether or not a timing of acquisition of any operation information including the operation information identified by the operation information identification information is in a timing range represented by the output timing information; and operation information output means for outputting the operation information identified by the operation information identification information to the execution means at the output timing represented by the output timing information in accordance with a result of a determination by the timing determination means.

(8) In the game delivery device as described in (1) or (2) above, the auxiliary function may include a function of making ineffective a predetermined attack against the operable object in the game program designed to be executed in the dedicated game device.

(9) In the game delivery device as described in (1) or (2) above, the auxiliary function may include a function of causing an acquisition of an item prepared in the game program designed to be executed in the dedicated game device.

(10) In the game delivery device as described in any one of (1) to (9) above, the execution means may operate on a basis of the operation information acquired by the operation information acquisition means when the normal mode is selected.

(11) A game delivery method according to the present invention includes executing a plurality of game programs designed to be executed in a dedicated game device in accordance with operation information; selecting one of the plurality of game programs on a basis of a selection instruction from a terminal; delivering, to the terminal, image information based on execution of the selected game program; acquiring a play mode selection instruction indicating whether the selected game program is to be played in a normal mode or an auxiliary mode; and when the auxiliary mode is selected, providing an auxiliary function that makes an operation of an operable object of the selected game program easier than the operation of the operable object designed to be performed in the dedicated game device.

(12) A game delivery program according to the present invention causes a computer to function as execution means for executing a plurality of game programs designed to be executed in a dedicated game device in accordance with operation information; game program selection means for selecting one of the plurality of game programs on a basis of a selection instruction from a terminal; delivery means for delivering, to the terminal, image information based on execution of the selected game program; play mode acquisition means for acquiring a play mode selection instruction indicating whether the selected game program is to be played in a normal mode or an auxiliary mode; and auxiliary means for, when the auxiliary mode is selected, providing an auxiliary function that makes an operation of an operable object of the selected game program easier than the operation of the operable object designed to be performed in the dedicated game device.

BRIEF DESCRIPTION OF DRAWINGS

FIG. 6 is a diagram illustrating examples of auxiliary information.

FIG. 7 is a diagram for explaining an auxiliary function in a golf game.

FIG. 8 is a diagram for explaining the auxiliary function in the golf game.

FIG. 10 is a diagram illustrating an example of an outline of a procedure of a process of S109 in FIG. 9.

FIG. 11 is a diagram illustrating another example of auxiliary information.

FIG. 12 is a diagram for explaining an example of an auxiliary function in a timing game.

FIG. 13 is a diagram for explaining an example of an auxiliary function in a shooting game.

FIG. 14 is a diagram illustrating another example of auxiliary information.

DESCRIPTION OF EMBODIMENTS

Figure 1:
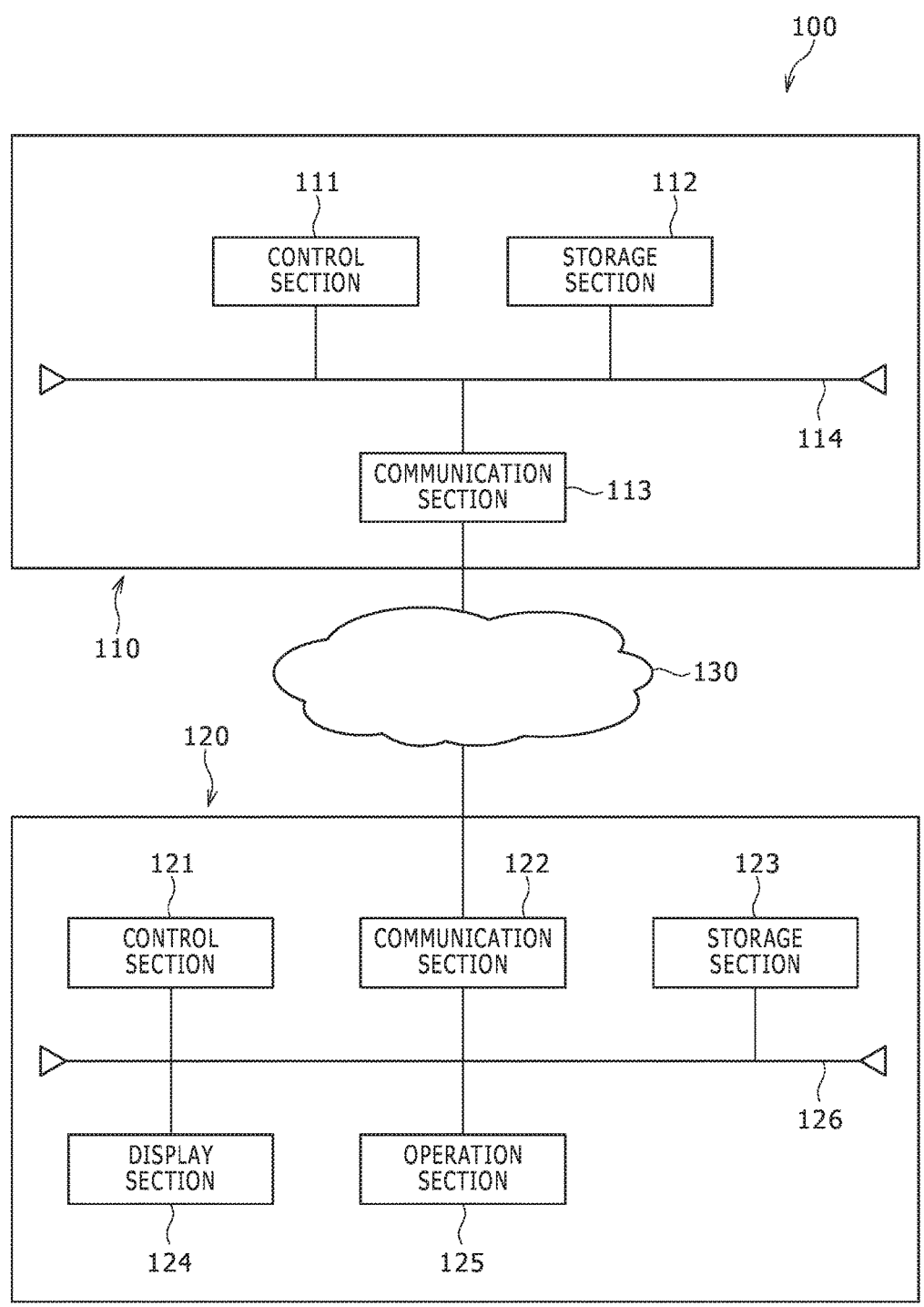
FIG. 1 is a diagram illustrating an outline of the hardware configuration of a game system according to the present embodiment.

Hereinafter, embodiments of the present invention will be described with reference to the accompanying drawings. In the accompanying drawings, the same or equivalent elements are designated by the same reference numerals, and redundant description is omitted.

FIG. 1 is a diagram for explaining an outline of the hardware configuration of a game system according to an embodiment of the present invention. As illustrated in FIG. 1, a game system 100 includes a server 110 and a terminal 120 connected to each other via a network 130 (for example, the Internet). Although the game delivery system 100 includes only one terminal 120 in FIG. 1, the game delivery system 100 may include a plurality of other terminals 120.

As illustrated in FIG. 1, the server 110 includes a control section 111, a storage section 112, and a communication section 113. In addition, the control section 111, the storage section 112, and the communication section 113 are connected to one another via a bus 114. The control section 111 is, for example, a central processing unit (CPU) or the like, and operates in accordance with a program stored in the storage section 112. The storage section 112 is formed by an information recording medium, such as, for example, a hard disk drive, a read-only memory (ROM), or a random-access memory (RAM), and is an information recording medium that holds the program to be executed by the control section 111. In addition, the storage section 112 operates also as a working memory for the control section 111. The communication section 113 is, for example, a network interface, and transmits and receives information via the network 130 in accordance with instructions from the control section 111.

The terminal 120 includes a control section 121, a communication section 122, a storage section 123, a display section 124, and an operation section 125. Similarly, the sections 121 to 125 are connected to one another via a bus 126. As with the server 110 described above, the control section 121 is, for example, a CPU or the like, and operates in accordance with a program stored in the storage section 123. The communication section 122 is a network interface, and transmits and receives information via the network 130 in accordance with instructions from the control section 121.

The storage section 123 is formed by an information recording medium, such as, for example, a hard disk, a ROM, or a RAM, and is an information recording medium that holds the program to be executed by the control section 121. In addition, the storage section 123 operates also as a working memory for the control section 121. The display section 124 is, for example, a liquid crystal display, an organic electroluminescence (EL) display, or the like, and displays information in accordance with an instruction from the control section 121. The operation section 125 is formed by an interface, such as, for example, a keyboard, a mouse, a controller, a button, and/or the like, and, in response to an instruction operation by a user, outputs a content of the instruction operation to the control section 121.

Note that each of the programs processed by the aforementioned control sections 111 and 121 may be, for example, downloaded and provided via the network, or may be provided via any type of computer-readable information recording medium, such as a compact disc (CD)-ROM, a digital versatile disc (DVD)-ROM, or the like. Also note that the above-described structures of the server 110 and the terminal 120 are merely examples, and are not essential to the present invention. Further, the above-described structure of the game delivery system 100 is merely an example and is not essential to the present invention, and the game delivery system 100 may be implemented by, for example, using a so-called cloud technology. The terminal 120 corresponds to, for example, a smartphone, a tablet, a notebook personal computer, a hand-held game device, or the like.

Figure 2:
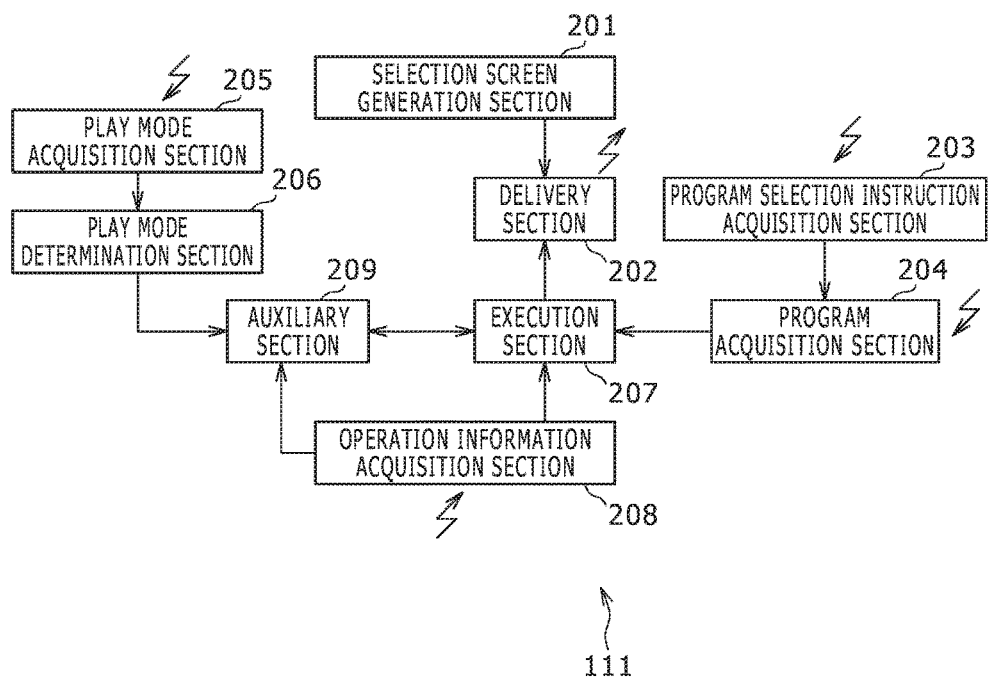
FIG. 2 is a diagram illustrating an example of a functional configuration of a server illustrated in FIG. 1.

FIG. 2 is a diagram illustrating an exemplary functional configuration of the server 110 illustrated in FIG. 1. As illustrated in FIG. 2, the server 110 functionally includes, for example, a selection screen generation section 201, a delivery section 202, a program selection instruction acquisition section 203, a program acquisition section 204, a play mode acquisition section 205, a play mode determination section 206, an execution section 207, an operation information acquisition section 208, and an auxiliary section 209.

Figure 3:
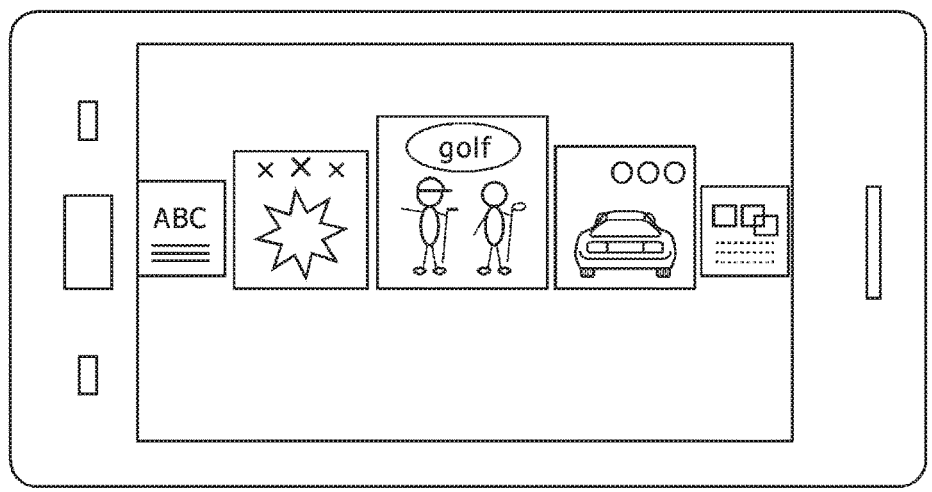
FIG. 3 is a diagram illustrating an example of a game selection screen.

The selection screen generation section 201 generates a game selection screen used to select a game provided in the game delivery system 100, and delivers the game selection screen to the terminal 120 via the delivery section 202. Specifically, if the user logs in to the game delivery system 100 via the terminal 120, for example, the selection screen generation section 201 generates selection screen information representing a game selection screen as illustrated in FIG. 3. The generated selection screen information is displayed on a screen of the terminal 120, which is used by the user, via the delivery section 202. Referring to this selection screen, the user selects a game program which the user desires to play via the operation section 125 of the terminal 120.

The program selection instruction acquisition section 203 acquires a program selection instruction that indicates the game program selected by the user. The program selection instruction includes, for example, program identification information that identifies the game program selected by the user.

The program acquisition section 204 acquires the game program selected by the user. Specifically, for example, the game program is stored in, for example, the storage section 112 or an external database (not shown), and the program acquisition section 204 acquires the game program selected by the user from the storage section 112 or the external database.

Figure 4:
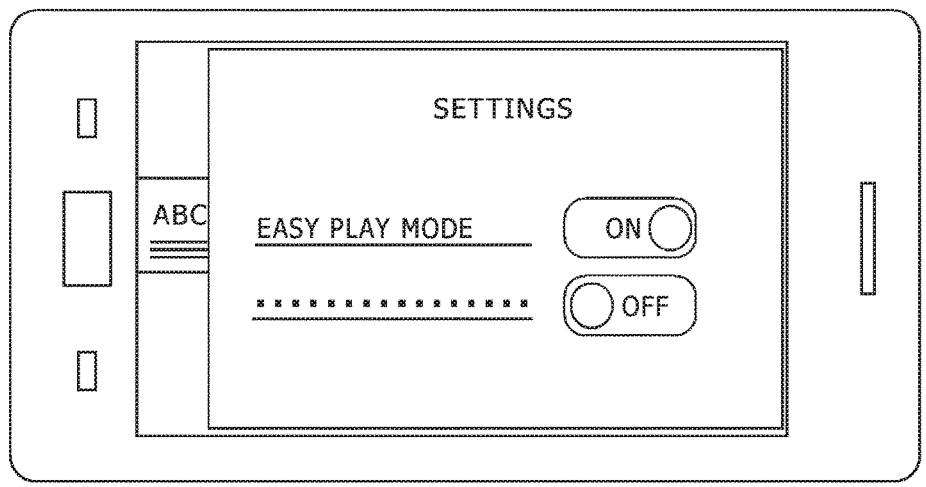
FIG. 4 is a diagram illustrating an example of a play mode selection screen.

In addition, the selection screen generation section 201 generates a play mode selection screen used to select a mode in which the selected game is to be played, and delivers the play mode selection screen to the terminal 120 via the delivery section 202. Specifically, after the program is selected as described above, for example, the selection screen generation section 201 generates a play mode selection screen as illustrated in FIG. 4, and delivers the play mode selection screen to the terminal 120 via the delivery section 202. Referring to the play mode selection screen, the user selects a play mode.

Here, play modes include, for example, a normal mode and an auxiliary mode. The normal mode corresponds to, for example, a mode in which a game program (hereinafter referred to as an "original game program") that is designed to be executed in a dedicated game device is played as designed. Meanwhile, the auxiliary mode corresponds to, for example, a mode in which the game program designed to be executed in the dedicated game device is played using an auxiliary function for making an operation of the game program easier. Specifically, examples of such auxiliary functions include a function of extending a pad-input timing range that produces the best shot in a golf game, for example, to a timing range wider than a timing range set in the original game program, and a function of protecting an operable object in a shooting game from an enemy attack with a barrier in a situation not specified by the original design. Note that the examples of the auxiliary functions are not limited to the above examples, and may include other functions that make user operations easier. Other examples of the auxiliary functions may include a function that makes the operation of the game more difficult, conversely. Also note that a single game program may include a plurality of auxiliary modes that provide different difficulty levels.

The play mode acquisition section 205 acquires a play mode selection instruction that indicates the selected play mode. Specifically, for example, referring to the play mode selection screen as described above, the user enables a function of the auxiliary mode using the operation section 125 of the terminal 120, and thereby issues an instruction to select the play mode. The play mode selection instruction includes, for example, play mode identification information that identifies the normal mode or the auxiliary mode.

The play mode determination section 206 determines whether the selected play mode is the auxiliary mode or the normal mode. Specifically, the play mode determination section 206 determines whether the selected play mode is the auxiliary mode or the normal mode on the basis of the play mode identification information included in the play mode selection instruction.

The execution section 207 executes the game program acquired by the program acquisition section 204. Here, the execution section 207 may be formed by, for example, an emulator for the dedicated game device, or a board corresponding to the dedicated game device.

The operation information acquisition section 208 acquires operation information for operating the operable object from the terminal 120 at regular time intervals. Specifically, for example, the operation information acquisition section 208 includes a buffer (not shown), the operation information from the terminal 120 is held in the buffer, and the operation information acquisition section 208 acquires the operation information from the buffer at predetermined timings. Note that, in the following description, an acquisition timing of the operation information is assumed to correspond to a timing at which the operation information is acquired from the buffer.

Here, examples of the operation information include an operational instruction indicating an "up," "down," "left," or "right" direction, and an operational instruction indicating whether or not a predetermined button has been pressed. More specifically, examples of the operation information include operation information corresponding to each button or the like on a controller of a dedicated game equipment. Note that examples of the operation information may include, in the case where the aforementioned controller includes a tilt operation member, operation information representing an analog value indicating the degree of a tilt operation performed on the tilt operation section. Also note that, in the case where the terminal 120 includes a touch panel, and each button or the like of the controller of the dedicated game device is not provided, an operation image corresponding to each button or the like may be displayed on the touch panel. Also note that each button or the like may be assigned to the operation section 125 of the terminal 120.

If the play mode determination section 206 determines that the selected play mode is the auxiliary mode, the auxiliary section 209 enables the auxiliary function. Here, the auxiliary function corresponds to, for example, the function of extending the pad-input timing range that produces the best shot in the golf game to the timing range wider than the timing range set in the original game program as described above.

Figure 5:
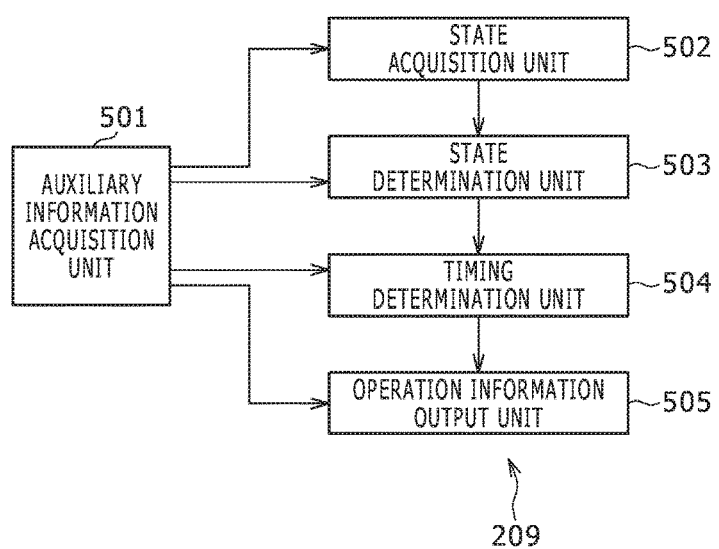
FIG. 5 is a diagram illustrating an example of a functional configuration of an auxiliary section illustrated in FIG. 2.

Specifically, referring to FIG. 5, the auxiliary section 209 functionally includes an auxiliary information acquisition unit 501, a state acquisition unit 502, a state determination unit 503, a timing determination unit 504, and an operation information output unit 505, for example. It is assumed in the following description that the selected game program is the golf game for the sake of illustration, but it should be noted that the present embodiment is not limited to this example.

The auxiliary information acquisition unit 501 acquires auxiliary information. Here, the auxiliary information is, for example, information representing an auxiliary function for facilitating the operation of the game program designed to be executed in the dedicated game device. Specifically, referring to FIG. 6, the auxiliary information includes, for example, program identification information, an execution state identification (ID) that represents an execution state, acquisition timing information that represents information as to the acquisition timing, output timing information that represents information as to an output timing, and an operation information ID. For example, execution state information representing information as to the execution state of the execution section when a shot is made as illustrated in FIG. 7 corresponds to, for example, execution state information represented by an execution state ID: s1. A program ID: P1 corresponds to program identification information that identifies a game program of the golf game. An operation information ID: b1 corresponds to operation information corresponding to this shot. The acquisition timing information corresponds to information representing a timing at which the operation information acquisition section 208 acquires predetermined operation information, and the output timing information corresponds to information representing a timing at which the predetermined operation information is outputted to the execution section 207. Note that the auxiliary information illustrated in FIG. 6 is merely an example, and that the auxiliary information may not necessarily be in a form as illustrated in FIG. 5.

The state acquisition unit 502 acquires the execution state information representing the execution state of the execution section 207. Specifically, the execution state information corresponds to, for example, image information generated by the execution section 207. Note that the execution state information may be configured to correspond to values of various registers included in the execution section 207.

The state determination unit 503 determines whether or not the execution state acquired by the state acquisition unit 502 is a predetermined execution state. Specifically, in the case of the above example, for example, the state determination unit 503 determines whether or not the execution state acquired by the state acquisition unit 502 is the predetermined execution state, when the degree of similarity between the execution state information represented by the execution state ID: s1 and the execution state information acquired by the state acquisition unit 502 is in a predetermined range.

If the state determination unit 503 determines that the execution state acquired by the state acquisition unit 502 is the predetermined execution state, the timing determination unit 504 determines whether or not the predetermined operation information acquired by the operation information acquisition section 208 has been acquired in a predetermined timing range. Specifically, in the case of the above example, the timing determination unit 504 determines whether or not the operation information identified by the operation information ID: b1 has been acquired in a range of the acquisition timing information, t1 to t3.

If the timing determination unit 504 determines that the predetermined operation information has been acquired in the predetermined timing range, the operation information output unit 505 outputs the predetermined operation information acquired by the operation information acquisition section 208 to the execution section 207 at a predetermined timing. In the case of the above example, if it is determined that the operation information identified by the operation information ID: b1 has been acquired in the range of the acquisition timing information, t1 to t3, the operation information output unit 505 outputs the operation information identified by the operation information ID: b1 to the execution section 207 at a timing t3 as represented by the output timing information. As indicated by a diagonally shaded area in FIG. 8, for example, the time range of t1 to t3 is set to be wider than a time interval that determines the best shot in the original game program. This allows operation information corresponding to a shot to be inputted to the execution section 207 with such a delay in timing as to produce the best shot. This extends a time interval that allows the user to make the best shot, resulting in an easier operation. Note that, in FIG. 8, the time interval that determines the best shot in the original game program is indicated by a circle.

Figure 9:
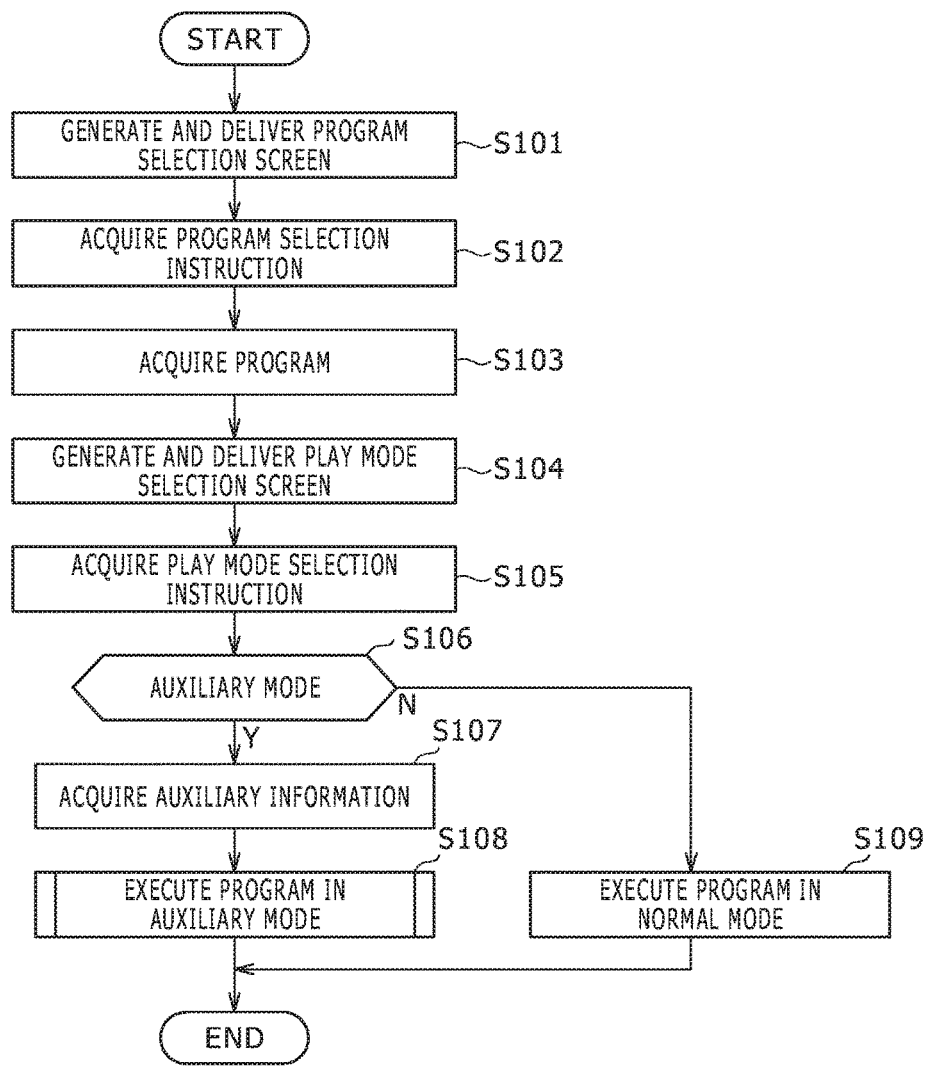
FIG. 9 is a diagram illustrating an example of an outline of a procedure of a process performed by the server according to the present embodiment.

Next, with reference to FIG. 9, an outline of a procedure of a process performed by the server 110 according to the present embodiment will now be described below. Note that, in the following description, an example case where the selected game is the golf game as described above and the auxiliary mode is selected will be described for the sake of illustration.

The selection screen generation section 201 generates the game selection screen, which is used to select the game provided by the game delivery system 100, and delivers the game selection screen to the terminal 120 via the delivery section 202 (S101). The program selection instruction acquisition section 203 acquires the program selection instruction indicating the game program selected by the user (S102). The program acquisition section 204 acquires the game program selected by the user (S103).

The selection screen generation section 201 generates the play mode selection screen used to select the mode in which the selected game is to be played, and delivers the play mode selection screen to the terminal 120 via the delivery section 202 (S104). The play mode acquisition section 205 acquires the play mode selection instruction indicating the selected play mode (S105). The play mode determination section 206 determines whether the selected play mode is the auxiliary mode or the normal mode (S106).

If it is determined at S106 that the selected play mode is the auxiliary mode, the auxiliary information acquisition unit 501 acquires the auxiliary information (S107). The server 110 executes the selected game program in the auxiliary mode (S108). Meanwhile, if it is determined at S106 that the selected play mode is the normal mode, the server 110 executes the selected game program in the normal mode (S109). Then, once the execution of the game program is finished, this procedure is ended.

Next, with reference to FIG. 10, an example procedure of the process of S108 will now be described more specifically below. Note that the procedure of the process of S108 to be described below is merely an example, and that the present embodiment is not limited to the procedure to be described below.

The execution section 207 starts the execution of the game program acquired by the program acquisition section 204 (S201). The operation information acquisition section 208 starts the acquisition of the operation information for operating the operable object from the terminal 120 (S202). The state acquisition unit 502 starts the acquisition of the execution state information (S203). Note that the processes of S201 to S203 are not limited to the above example, but may be started simultaneously, for example.

The state determination unit 503 determines whether or not the execution state acquired by the state acquisition unit 502 is the predetermined execution state (S204). The predetermined execution state corresponds to, for example, the execution state indicated by the auxiliary information as described above.

If the state determination unit 503 determines at S204 that the execution state acquired by the state acquisition unit 502 is the predetermined execution state, the timing determination unit 504 determines whether or not the predetermined operation information acquired by the operation information acquisition section 208 has been acquired in the predetermined timing range (S205). Here, the predetermined operation information and the predetermined timing range correspond to, for example, the operation information and the timing range, respectively, indicated by the auxiliary information.

If the timing determination unit 504 determines at S205 that the predetermined operation information has been acquired in the predetermined timing range, the operation information output unit 505 outputs the predetermined operation information acquired by the operation information acquisition section 208 to the execution section 207 at the predetermined timing (S206). In this case, the execution section 207 executes the game program in accordance with this operation information. Here, the predetermined timing corresponds to the timing indicated by the auxiliary information.

Meanwhile, if the state determination unit 503 determines at S204 that the execution state acquired by the state acquisition unit 502 is the predetermined execution state, and the timing determination unit 504 determines at S205 that the predetermined operation information has been acquired in the predetermined timing range, the procedure returns to S204. Note that, although not shown in FIG. 10, this procedure is finished in response to an instruction by the user to terminate the game program, an end of the game program, or, when only a predetermined stage of the game is executed, an end of this stage.

Note that the present invention is not limited to the above-described embodiment, and that a variety of modifications are possible. For example, the configuration of the above-described embodiment may be replaced with substantially the same configuration, the configuration that produces substantially the same advantageous effects, or the configuration that is capable of accomplishing substantially the same objects.

For example, the auxiliary function may be, for example, a function in a baseball game for allowing a batter to make a swing with the best timing against a pitch by a pitcher. Specifically, in this case, for example, the auxiliary information includes a program ID, an execution state ID, output timing information, and an operation information ID as illustrated in FIG. 11. Here, the program ID identifies this baseball game, the execution state ID identifies execution state information that represents an execution state when the pitcher throws a ball, the output timing information represents a timing: t1 at which the batter makes a swing with the best timing, and the operation information ID represents an operation information ID: b1, which represents operation information of the swing. Then, as in the above-described embodiment, if the state determination unit 503 determines that the execution state acquired by the state acquisition unit 502 corresponds to the execution state represented by the above execution state ID, the operation information output unit 505 inputs the operation information represented by the operation information ID: b1 to the execution section 207 at the timing represented by the output timing information: t1. This can, for example, allow the user to have the sole charge of moving the position of the batter without the need for the user to perform a swing operation, resulting in an easier operation.

Further, the auxiliary function may be, for example, a function of automatically converting a pressing of any button to a pressing of the right button in a game program in which a specific one of a plurality of buttons is to be pressed at a predetermined timing in accordance with music or the like as illustrated in FIG. 12. FIG. 12 illustrates a game screen of a game program in which a button or the like corresponding to a circle is to be pressed at a timing when a moving shaded circle overlaps a solid circle. Specifically, in this case, for example, in the auxiliary information as illustrated in FIG. 6, the auxiliary information may be configured such that the execution state represented by the execution state ID represents image information at a predetermined timing before the button input is made, the acquisition timing information represents a timing at which any button is pressed, the output timing information represents a predetermined timing, and the operation information represented by the operation information ID represents operation information to be inputted to the execution section 207 at this timing. Then, as in the above-described embodiment, for example, the state determination unit 503 determines whether or not the image information acquired by the state acquisition unit 502 is the image information at the predetermined timing, and if the state determination unit 503 determines that the image information acquired by the state acquisition unit 502 is this image information, the timing determination unit 504 determines whether or not the operation information representing a pressing of any button acquired by the operation information acquisition section 208 has been acquired in the range of the above predetermined timing. If the timing determination unit 504 determines that the operation information has been acquired in the range of the above predetermined timing, the operation information output unit 505 outputs, to the execution section 207, the operation information to be inputted to the execution section 207 at the above timing. As a result, if the user presses any button at a timing extended relative to a timing set in the original game program, the operation information to be inputted is inputted at the right timing, resulting in an easier operation. Note that the above configuration may be modified such that simplification is made with respect to only timing, or that an input of any operation information is treated as an input of the right operation information.

Furthermore, the auxiliary function may be a function, in a shooting game or the like, of providing assistance in an operation related to a series of movements to automatically avoid an obstacle or the like in a predetermined situation as illustrated in FIG. 13, for example. In this case, as illustrated in FIG. 14, the auxiliary information includes, for example, a program ID that identifies this game program, an execution state ID that represents an execution state in the predetermined situation, an operation series information ID that represents this series of movements, and an operation information ID that represents predetermined operation information. Then, as in the above-described embodiment, for example, the state determination unit 503 determines whether or not the image information acquired by the state acquisition unit 502 is image information at the predetermined timing. Then, if the state determination unit 503 determines that the image information acquired by the state acquisition unit 502 is this image information, the operation information output unit 505 causes operation information related to the series of movements to be inputted to the execution section 207. Note that, in this case, the game delivery system 100 may be further provided with an operation information acquisition section 208 that acquires position information of the operable object, and the operation information related to the series of movements identified by the operation information ID may be modified in accordance with the position information. Also note that acquisition of the position information may be achieved, for example, through image recognition or the like. This eliminates the need for the user to perform a moving operation in the predetermined situation, which leads to an easier operation. Note that, in this case, a part of the game program may be altered to make an enemy attack or the like that occurs during this movement ineffective in the shooting game, for example. It should be noted that the above configuration is merely an example, and that the system side may be configured to recognize an obstacle, an enemy attack, or the like through the image recognition or the like, and perform an operation of avoiding the obstacle, the enemy attack, or the like, for example.

Furthermore, the auxiliary function may be, for example, a function of offering a condition in which any enemy attack would be ineffective in a predetermined situation in the case of the auxiliary mode. Note that, in this case, when this condition has been removed, a pop-up notification of this fact may be presented on the screen of the terminal 120. Note that, as this barrier condition, a barrier condition that is already designed in the original game program, such as a barrier condition or the like in the shooting game, for example, may be used. Also note that the auxiliary function may be implemented by, for example, altering a part of the original game program so as to offer the auxiliary function. Also note that the barrier condition may be a barrier condition that is not included in the design of the original game program, such as a condition that enables the operable object to be guarded with a finger or the like, in the case where the terminal 120 includes a touch-panel screen.

Furthermore, the auxiliary function may be a function of causing an acquisition of a predetermined item prepared in the original game program in a predetermined situation. This auxiliary function may be implemented by, for example, altering a part of the original game program so as to offer this auxiliary function. Note that the predetermined situation may be set as a situation in which the player has become lower in the rank in a racing game, and the predetermined item may be set as an item designed in the original game (e.g., an item that causes an acceleration), for example. Also note that this item may be superimposed and displayed on a game screen of the original game program to allow the user to use the item as necessary. Alternatively, the auxiliary function may be a function of causing the game delivery system 100 side to perform at least some of operations in a fighting game, with an enemy attack, the position of the operable object, and/or the like recognized through the image recognition or the like.

Furthermore, the auxiliary function may be, for example, a function of acquiring a plurality of pieces of operation information from a plurality of users, and causing one of the plurality of pieces of operation information to be inputted to the execution section 207 in accordance with a predetermined condition. More specifically, the auxiliary function may be configured to, in a quiz game that is designed to be played by one user, cause operation information corresponding to the right answer, if it is included in the plurality of pieces of operation information, to be inputted to the execution section 207, for example. This allows only one piece of operation information corresponding to the right answer included in the pieces of operation information from the plurality of users to ensure the right answer while causing a failure to be determined only when all the pieces of operation information inputted by the plurality of users represent wrong answers, and thus reduces the difficulty level of the game. Further, the auxiliary function may be configured to, in a single-player adventure game in which the game progresses with choices of alternatives, cause, out of the pieces of operation information from the plurality of users, the piece of operation information that is greatest in number and is determined by the majority rule to be inputted to the execution section 207, for example. This enables the single-player adventure game to be played by a plurality of cooperating users, and may lead to a reduction in the difficulty level of the game.

Furthermore, the auxiliary function may be, for example, a function of allowing all or some of pieces of operation information from a plurality of users to be selectively inputted to the execution section 207 in accordance with a predetermined stage or scene in a single-player game. This makes it possible to switch the user every time one circuit of a racing course is made in a single-player racing game, for example. Specifically, in this case, only operation information from one user is inputted to the execution section 207 during a first lap, and only operation information from another user is inputted to the execution section 207 during a second lap, for example. Note that, regarding some of the pieces of operation information (for example, sounding of a horn), it may be so arranged that, in place of the some pieces of operation information from the one user, the some pieces of operation information from another user are inputted to the execution section 207. Also note that, while the case where the user is switched every time one circuit is made has been described above, it may be so arranged that the user is switched when a predetermined event has occurred, such as when instances of sliding off the track have occurred three or more times, or when the player has become lower in the rank. Note that a game delivery device recited in the appended claims corresponds to, for example, the server 110 described above.

The invention claimed is:

1. A game delivery device comprising:
   execution unit operating to execute a plurality of game programs designed to be executed in a dedicated game device in accordance with operation information;

game program selection unit operating to select one of the plurality of game programs on a basis of a selection instruction from a terminal;

delivery unit operating to deliver, to the terminal, image information based on execution of the selected game program;

play mode acquisition unit operating to acquire a play mode selection instruction indicating whether the selected game program is to be played in a normal mode or an auxiliary mode; and auxiliary unit operating to provide, when the auxiliary mode is selected, an auxiliary function that makes an operation of an operable object of the selected game program easier than the operation of the operable object designed to be performed in the dedicated game device.

2. The game delivery device according to claim 1, wherein the auxiliary unit further includes:

state acquisition unit operating to acquire an execution state of the execution means; and state determination unit operating to determine whether or not the acquired execution state satisfies a predetermined condition, and the auxiliary unit provides the auxiliary function when the state determination means has determined that the predetermined condition is satisfied.

3. The game delivery device according to claim 2, wherein the auxiliary unit further includes:

auxiliary information acquisition unit operating to acquire auxiliary information including, in a correlated manner, game program identification information that identifies the selected game program, execution state identification information related to the predetermined condition, output timing information that represents an output timing of predetermined operation information, and operation information identification information that identifies the predetermined operation information;

timing determination unit operating to determine, when the state determination means has determined that the predetermined condition is satisfied, whether or not a timing of acquisition of the operation information identified by the operation information identification information included in the auxiliary information is in a timing range represented by the output timing information; and operation information output unit operating to output the operation information to the execution unit at the output timing represented by the output timing information in accordance with a result of a determination by the timing determination unit.

4. The game delivery device according to claim 1, wherein the auxiliary function is a function of causing operation information acquired at a timing earlier than a previously set timing to be inputted to the execution unit at the previously set timing.

5. The game delivery device according to claim 2, wherein the auxiliary unit further includes:

auxiliary information acquisition unit operating to acquire auxiliary information including, in a correlated manner, game program identification information that identifies the selected game program, execution state identification information that represents a predetermined execution state of the execution means, operation series information identification information that identifies information as to a series of operations, and operation information identification information that identifies predetermined operation information; and operation information output unit operating to output the operation series information identification information to the execution unit when the state determination unit has determined that the predetermined condition is satisfied, and the predetermined operation information has been acquired.

6. The game delivery device according to claim 5, wherein the auxiliary unit further includes position information acquisition unit operating to acquire position information representing a position of the operable object, and the information as to the series of operations is modified in accordance with the position information.

7. The game delivery device according to claim 2, wherein the auxiliary unit further includes:

auxiliary information acquisition unit operating to acquire auxiliary information including, in a correlated manner, game program identification information that identifies the selected game program, execution state identification information related to the predetermined condition, output timing information that represents an output timing of predetermined operation information, and operation information identification information that identifies the predetermined operation information;

timing determination unit operating to determine, when the state determination means has determined that the predetermined condition is satisfied, whether or not a timing of acquisition of any operation information including the operation information identified by the operation information identification information is in a timing range represented by the output timing information; and operation information output unit operating to output the operation information identified by the operation information identification information to the execution unit at the output timing represented by the output timing information in accordance with a result of a determination by the timing determination unit.

8. The game delivery device according to claim 1, wherein the auxiliary function includes a function of making ineffective a predetermined attack against the operable object in the game program designed to be executed in the dedicated game device.

9. The game delivery device according to claim 1, wherein the auxiliary function includes a function of causing an acquisition of an item prepared in the game program designed to be executed in the dedicated game device.

10. The game delivery device according to claim 1, wherein the execution unit operates on a basis of the operation information acquired by the operation information acquisition means when the normal mode is selected.

11. A game delivery method comprising:

executing a plurality of game programs designed to be executed in a dedicated game device in accordance with operation information;

selecting one of the plurality of game programs on a basis of a selection instruction from a terminal;

delivering, to the terminal, image information based on execution of the selected game program;

acquiring a play mode selection instruction indicating whether the selected game program is to be played in a normal mode or an auxiliary mode; and when the auxiliary mode is selected, providing an auxiliary function that makes an operation of an operable object of the selected game program easier than the operation of the operable object designed to be performed in the dedicated game device.

12. A non-transitory, computer readable recording medium containing a game delivery program, which when executed by a computer, causes the computer to carry out actions, comprising:

executing a plurality of game programs designed to be executed in a dedicated game device in accordance with operation information;

selecting one of the plurality of game programs on a basis of a selection instruction from a terminal;

delivering, to the terminal, image information based on execution of the selected game program;

acquiring a play mode selection instruction indicating whether the selected game program is to be played in a normal mode or an auxiliary mode; and providing, when the auxiliary mode is selected, an auxiliary function that makes an operation of an operable object of the selected game program easier than the operation of the operable object designed to be performed in the dedicated game device.

* * * * *